WITNESSES
Theodore T. Wrobel
James T. Young

INVENTORS
Cecil J. Mole
& William M. Wepfer
BY [signature]
ATTORNEY

April 20, 1965 C. J. MOLE ETAL 3,178,894

THERMOELECTRIC HEAT PUMPING APPARATUS

Filed Oct. 30, 1963 6 Sheets-Sheet 3

THERMOELECTRIC HEAT PUMPING APPARATUS

THERMOELECTRIC HEAT PUMPING APPARATUS

Filed Oct. 30, 1963 6 Sheets-Sheet 5

THERMOELECTRIC HEAT PUMPING APPARATUS

HEATED FLUID FLOW CIRCUIT

COOLED FLUID FLOW CIRCUIT

United States Patent Office
3,178,894
Patented Apr. 20, 1965

3,178,894
THERMOELECTRIC HEAT PUMPING APPARATUS

Cecil J. Mole, Monroeville, and William M. Wepfer, Pittsburgh, Pa., assignors to Westinghouse Electric Corporation, Pittsburgh, Pa., a corporation of Pennsylvania Filed Oct. 30, 1963, Ser. No. 320,160
10 Claims. (Cl. 62—3)

Our invention is directed generally to thermoelectric assemblies and more particularly to arrangements of thermoelectric elements in heat exchange relationship with fluids to provide maximum performance in the cooling of such fluids for air conditioning or refrigeration applications or in warming such fluids for heating purposes. This invention is also directed to a thermoelectric arrangement which operates as an electrical generator.

Thermoelectric apparatus have been constructed in the past for imparting heat and/or cold to fluids, however, the heat removal or absorbing capacity of such prior art apparatus when compared to the relatively expensive thermoelectric materials which must be utilized with such prior art arrangements causes the cost thereof to be prohibitive.

The present invention, as will be explained in detail hereinafter, overcomes the deficiencies of the prior art and results in novel structures where heat addition and/or removal capacities of such apparatus are increased substantially, while, at the same time, the amount of thermoelectric material utilized is substantially reduced. In accordance with this invention, a heat flow path in adjacent stacks of thermoelectric devices is provided from the thermoelectric material to the heat transfer fluid in a manner eliminating electrical insulation, a major contribution to thermal resistance, from the heat flow path. This arrangement provides electrical insulation between adjacent current flow paths in the thermoelectric structure to prevent short-circuiting of current flow which would result in the bypassing of certain of the thermoelectric junctions.

Accordingly, it is an object of this invention to provide a novel and efficient thermoelectric heat producing and removing arrangement which minimizes the amount of thermoelectric material required to attain a predetermined heating and/or cooling capacity.

Another object of this invention is to provide a novel and efficient thermoelectric arrangement for the generation of electricity.

A further object of this invention is to provide a novel and efficient thermopile having a plurality of thermocouple junctions and a heat exchange fluid flowing thereadjacent wherein a heat flow path between the junctions and the fluid is formed with no electrical or thermal insulation therein.

A further object of this invention is to provide a novel and efficient thermopile having a plurality of serially connected adjacent stacks each forming a current and heat flow path and having electrical insulation disposed only between such stacks.

A further object of this invention is to provide a novel and efficient thermopile having a plurality of serially connected adjacent stacks each forming a current and heat flow path and having electrical insulation disposed between such stacks but having no electrical insulation in the heat flow path between the thermoelectric junctions and a heat exchange fluid.

Another object is to provide a novel thermoelectric refrigeration apparatus of compact size, low cost and of high efficiency.

Further objects and advantages of our invention and features of novelty which characterize the invention will be pointed out in particularity in the claims annexed to and forming a part of this specification.

For a better understanding of our invention, reference may be had to the accompanying drawings, in which.

THEORY OF APPROACH

Considering the problem of thermoelectric heating or cooling and from the standpoint of the equations which, according to our present understanding of the art, govern the performance thereof, a thermopile for providing cooling having ultimate utility in the area of air conditioning or refrigeration will be analyzed in detail. From time to time as this analysis proceeds, ultimate conclusions will be pointed out in particularity.

According to our understanding of the phenomenon of thermoelectric cooling, the basic equation governing the pumping of heat by thermoelectric devices is:

$$Q = 3.413\alpha It_c - 3.413\tfrac{1}{2}I^2R - K\Delta t_p \qquad (1)$$

where:

$Q$=heat pumped; B.t.u./hr.
$I$=current; amperes
$\alpha$=thermoelectric power; $\mu$ volts/° F.
$t_c$=absolute cold junction temperature; ° F.
$R$=electrical resistance across thermoelectric pellet; ohms
$K$=thermal conductivity of thermoelectric pellet; B.t.u./° F.
$\Delta t_p$=temp. difference between pellet hot and cold junctions; ° F.

Considering Equation 1, it will be noted that the quantity $\alpha It_c$ should be maximized in value as it makes a positive contribution to the amount of heat pumped. Similarly, since the quantities $\tfrac{1}{2}I^2R$ and $K\Delta t$ detract from the amount of heat pumped, these quantities should be minimized. Furthermore, it must be realized that certain of the above quantities are interrelated so that an attempt to maximize a positively contributing quantity may well increase the effect of a negatively contributing quantity to a degree greater than the positive contribution.

Figure 1:
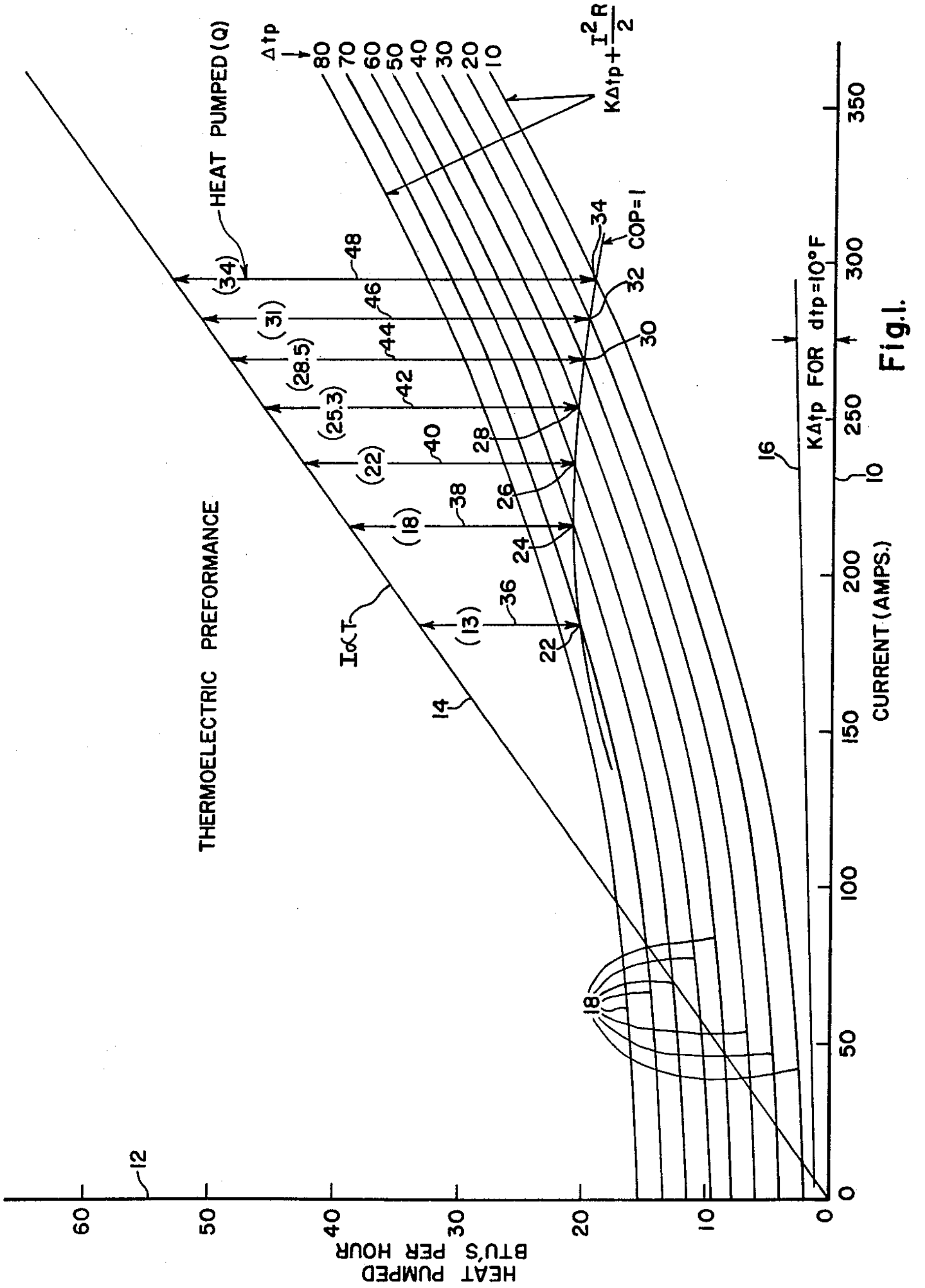
FIGURE 1 is a graphical illustration analyzing the operation of a thermoelectric construction formed pursuant to the principles of this invention.

More specifically in FIG. 1 there is illustrated the component quantities of Equation 1. It is to be realized that for any thermoelectric apparatus a Coefficient of Performance (COP) must be chosen for the purpose of setting the desired operating efficiencies of the apparatus.

The Coefficient of Performance is defined as:

$$\text{COP}=\frac{\text{Heat pumped}}{\text{Input power required to pump heat}}=\frac{Q}{I^2R+\alpha I\Delta t_p} \qquad (2)$$

In FIG. 1, the current flowing through a thermoelectric device having a pellet length of 0.25 in. and having no thermal resistance in the heat flow path is plotted on the horizontal axis or abscissa 10 and the heat pumped therethrough is plotted on the vertical axis or ordinate 12. With these coordinates, the quantity $\alpha It$ is depicted by the curve 14; the quantity $K\Delta t_p$ for $\Delta t_p=10°$ F. is depicted by the curve 16; the quantity $K\Delta t_p+\frac{1}{2}I^2R$ for various values of $\Delta t_p$ are depicted by set of curves 18; and the quantity of COP=1 is plotted by the curve 20. At points 22, 24, 26, 28, 30, 32 and 34 where the COP=1 curve 20 intersects the $K\Delta t_p+\frac{1}{2}I^2R$ curves 18, the vertical distance between such points and the curve 14, is set forth by the lines 36, 38, 40, 42, 44, 46, and 48. The length of each of the lines 36, 38, 40, 42, 44, 46 and 48 depicts the quantity Q for a thermoelectric device designed to operate at a predetermined current flow therethrough and at predetermined temperature difference across the pellet ($\Delta t_p$). The results of the FIG. 1 analysis is set forth by the following table.

TABLE I

*Thermoelectric operation*

[Conditions: pellet length=0.25 in., pellet area=1 in.²; pellet composition=bismuth telluride, COP=1; no thermal insulation in heat flow path. Figure of merit=$2.5\times10^{-3}$/° C.]

| Current (amps) | $\Delta t_p$ (° F.) | Q (B.t.u./hr.) | Point |
|---|---|---|---|
| 184 | 70 | 13 | 22 |
| 216 | 60 | 18 | 24 |
| 238 | 50 | 22 | 26 |
| 254 | 40 | 25.3 | 28 |
| 268 | 30 | 28.5 | 30 |
| 282 | 20 | 31 | 32 |
| 294 | 10 | 34 | 34 |

It will therefore be seen that the quantity of heat pumped (Q) increases as the temperature across the thermoelectric pellet is decreased and the current through the thermoelectric element is increased.

The resistance R across the pellet is governed by the equation:

$$R=\rho L/A \qquad (3)$$

where:

$\rho$=pellet resistivity
$L$=pellet length
$A$=pellet area

It will therefore be seen that the pellet length should be minimized to decrease the pellet resistance and similarly the pellet area should be maximized to an optimum ratio of pellet length to pellet area.

It has been determined that for a given temperature difference between the heat source and the heat sink and for a given thermal resistance in the heat flow path and for a given figure of merit ($\alpha 2/\rho K$) for the thermoelectric system together wtih a given COP, an optimum ratio of pellet length to pellet area ($L/A$) can be determined. It is to be realized that while it is an objective of this invention to remove thermal resistance from the heat flow path in the thermoelectric system, even the best heat conductors, such as silver, copper and aluminum, have associated with them some thermal resistance (usually of very low magnitude). Thus, it must be taken into consideration that while shorter pellets of larger areas will increase the heat produced, the problem is one of pumping the heat through pellet to the heat sink and hence an optimum ratio of pellet length to pellet area can be achieved. Thus, an objective is to provide an optimum pellet length to pellet area ratio for a given thermoelectric arrangement. Furthermore, since the cost of thermoelectric material is a major factor in the cost of a thermopile, it is to be realized that the construction of a choice of optimized pellet length to pellet area ratio will result in a substantially less expensive yet more efficient thermopile per unit area by virtue of the reduction of the total amount of thermoelectric material used.

As pointed out above, the quantity $K\Delta t_p$ detracts from the amount of heat pumped (Q). In all arrangements of the prior art of which we are aware, there are large thermal resistances in the heat flow path which tend to enlarge the quantity $K\Delta t_p$, inter alia, as follows:

In the quantity $K\Delta t_p$, the quantity K is substantially constant, and the quantity $\Delta t_p$ varies pursuant to the following equation:

$$\Delta t_p=\Delta t+\Delta t_{rh}+\Delta t_{rc} \qquad (4)$$

where:

$\Delta t$=temperature difference between heat source and heat sink
$\Delta t_{rh}$=temperature drop between pellet and heat sink
$\Delta t_{rc}$=temperature drop between pellet and heat source For any given condition of temperature difference between the heat source and heat sink, the heat pumping rate depends upon the thermal resistances in the heat flow path. However, in accordance with this invention, apparatus are provided wherein $\Delta t_{rh}$ and $\Delta t_{rc}$ are specifically made to approach zero since the principal thermal resistances, located between the pellet and the heat source and between the pellet and the heat sink, are substantially eliminated. Thus the quantities $\Delta t_{rh}$ and $\Delta t_{rc}$, which act to enlarge the quantity $\Delta t_p$, approach zero. Accordingly, for structures pursuant to this invention, Equation 4 approaches the ideal case where:

$$\Delta t_p=\Delta t \qquad (5)$$

Thus, it may also be concluded from this analysis that thermal resistances in the heat flow paths must be kept at the lowest levels possible.

The main source of thermal resistances in conventional systems is electrical insulation which separates adjacent stages of the thermopile. With prior structures, electrical insulation was necessary between the heat source, the heat sink and the thermoelectric pellets. The thickness of such insulation depended upon the test voltage of such devices. Obviously, the higher the voltage, the more difficult the heat transfer problems with such systems becomes. For production apparatus of wide utility, the test voltage would be required to meet a level up to 2000 volts, to satisfy NEMA standards for safety. To achieve such voltages and retain adequate thermal performance, electrical insulation in the heat flow path must be removed. Devices pursuant to this invention wherein the thermal and electrical resistances in the heat flow path have been removed and termed herein as "direct transfer" devices.

Figure 2:
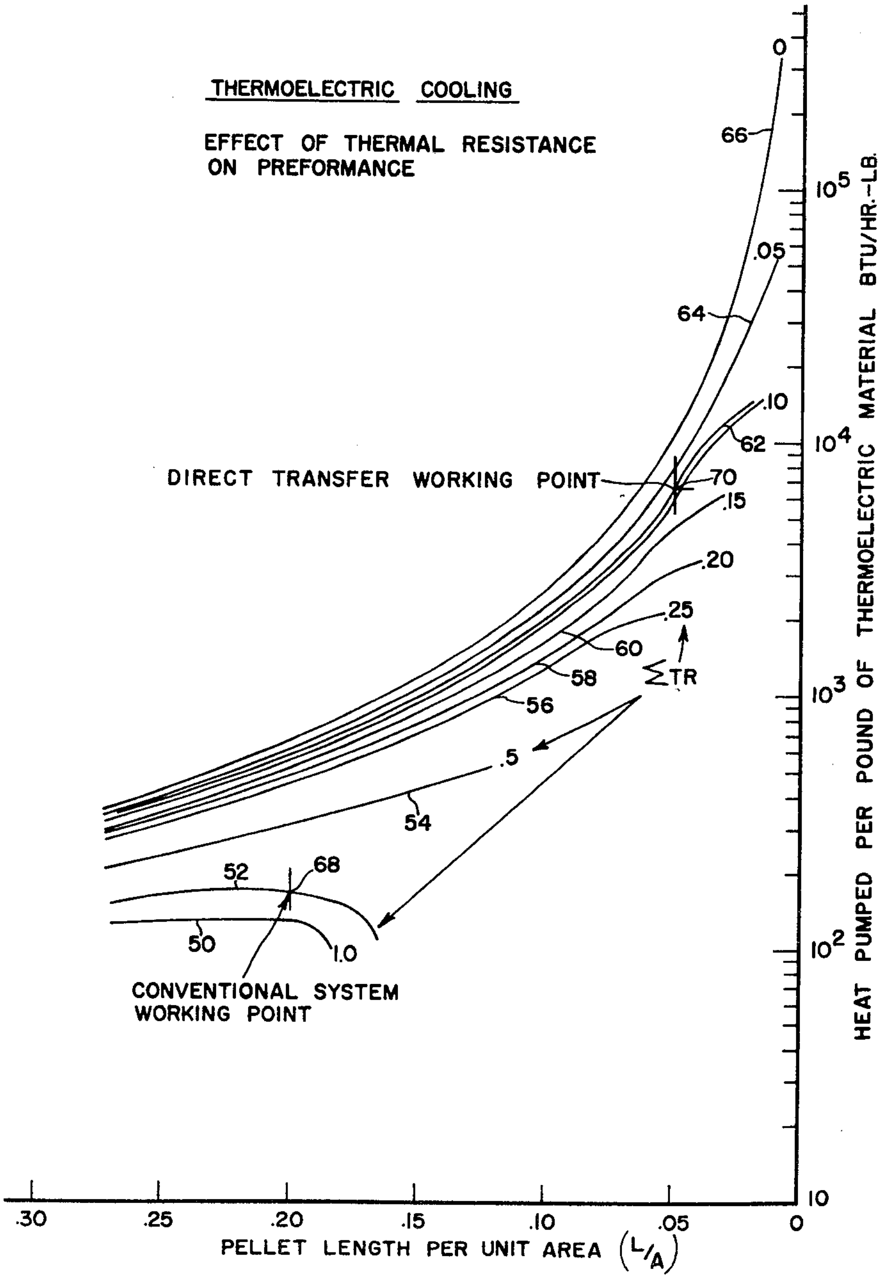
FIG. 2 is another graphical illustration showing the effect of thermal resistance on the performance of a thermoelectric construction.

A comparison of the operating levels and capabilities of "direct transfer" devices versus conventional devices having thermal insulation in the heat flow paths thereof is illustrated graphically in FIG. 2 of the accompanying drawings. In FIG. 2, there is plotted on the abscissa, the length to area ratio of the pellet on a linear scale while on the ordinate, on a logarithmic scale there is plotted the heat pumped per pound of thermoelectric material (B.t.u./hr.-lb.). Each curve illustrated in FIG. 2 depicts the characteristic of a thermoelectric element for a given quantity of thermal resistance in each heat flow path between the heat source and the heat sink. The curves of FIG. 2 are identified respectively by the reference characters 50, 52, 54, 56, 58, 60, 62, 64 and 66 and the characteristics of each curve are identified by the following table:

TABLE II

[Effect of thermal resistance on performance conditions. Temperature difference between heat source and heat sink ($\Delta t$)=30° F., COP=unity; Fig. of merit of system ($a2/\rho K$)=$2.5\times10^{-3}$/° C.]

| Curve No. | Thermal Resistance (° F./B.t.u.-hr.) | Heat pumped per lb. of material at pellet length to pellet area ratio |
|---|---|---|
| 50 | 1.0 | 130 B.t.u./lb./hr. at .20 in. per unit area |
| 52 | 0.9 | 170 B.t.u./lb./hr. at .20 in. per unit area. |
| 54 | 0.5 | 510 B.t.u./lb./hr. at .125 in. per unit area. |
| 56 | 0.25 | 2,150 B.t.u./lb./hr. at .05 in. per unit area. |
| 58 | 0.20 | 3,180 B.t.u./lb./hr. at .05 in. per unit area. |
| 60 | 0.15 | 4,650 B.t.u./lb./hr. at .05 in. per unit area. |
| 62 | 0.10 | 6,600 B.t.u./lb./hr. at .05 in. per unit area. |
| 64 | 0.05 | 7,950 B.t.u./lb./hr. at .05 in. per unit area. |
| 66 | 0.00 | 10,800 B.t.u./lb./hr. at .05 in. per unit area. |

Thus it can be seen from Table II that by decreasing the thermal resistance in the heat flow path, the amount of heat pumped per pound of material used increases substantially exponentially with a decrease in thermal resistance. Viewing curves 50 and 52 wherein substantial thermal resistances exist, it should be noted that performance increases up to a pellet length of 0.20 in. but that as pellet length is further decreased, the performance falls off rapidly. For "direct transfer" systems, the minimum length to area ratio can be decreased to a range between 0.05 and 0.02 inch per unit area. It is to be realized, of course, that curve 66 of FIG. 2 which depicts zero thermal resistance is merely a theoretical calculation, as structures having no thermal resistance cannot in practice be achieved. Furthermore, it must be realized that for very small pellet lengths a substantial amount of heat is generated but that it is impossible to remove or pump all of the generated heat therefrom to the heat sink. Thus an optimum pellet thickness must be chosen with consideration given to the heat removal capabilities of the system construction. For example, in FIG. 2, the point 68 on curve 52 depicts the operating level of systems forming the prior art. At point 68, 170 B.t.u./hr.-lb. would be generated. By reducing the thermal resistance in the system and by decreasing the pellet thickness to a value wherein the system is capable of transporting or pumping substantially all of the heat generated to the heat sink, substantially more heat can be pumped pursuant to the teachings of this invention. More specifically, at point 70 on curve 62, 6600 B.t.u./hr./lb. can be pumped for a pellet length of 0.05 in. per unit area and a thermal resistance of 0.10° F./B.t.u.-hr.

Once a "direct transfer" system is achieved wherein thermal resistances are substantially reduced, it is desirable to determine what the effect of higher operating currents for the thermopile will achieve. Since pellet length decreased, the system resistance is decreased and higher currents result. It must be remembered that in systems utilizing electrical insulation in the heat flow paths the increasing of the applied test voltages necessary for safety and reliability tests (NEMA Standards) would require an increase in the size of the electrical insulation, thereby resulting in an increase in the thermal resistance in the heat flow path. Accordingly, the following analysis is made only in conjunction with a system having no electrical insulation (thermal resistance) in the heat flow path. Concurrently with increased currents, the pellet length is made one-fifth the size of the pellets depicted in FIG. 1.

Figure 3:
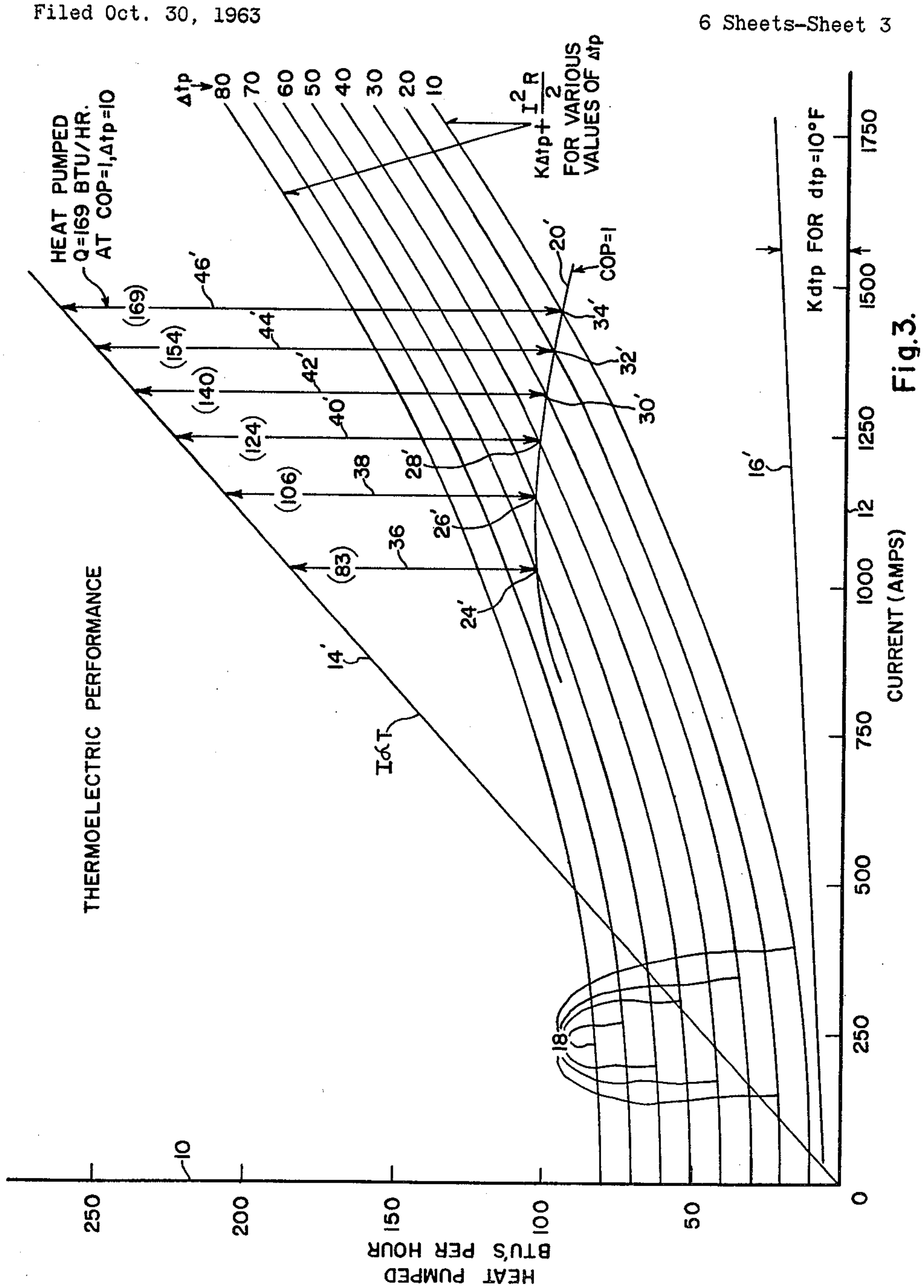
FIG. 3 is a graphical illustration similar to FIG. 1 for thermoelectric elements of smaller length than those utilized in FIG. 1.

FIG. 3 is a graph similar to FIG. 1 showing a family of curves for a pellet length per unit area of one-fifth the length per unit area utilized for FIG. 1. In FIG. 3, the curves are otherwise the same as those illustrated in FIG. 1 and are identified by the same reference characters utilized in FIG. 1, but such reference characters are primed.

From FIG. 3, the following Table III is derived and is similar to Table I:

TABLE III

*Thermoelectric operation*

[Conditions: pellet length=0.05 in.; pellet area=1 in.$^2$; pellet composition =bismuth telluride; COP=1; no thermal insulation in heat flow path $t_{rc}=t_{rb}$]

| Current (Amps) | $\Delta t_p$(° F.) | Q(B.t.u./hr.) | Point |
|---|---|---|---|
| 1,030 | 60 | 83 | 24′ |
| 1,153 | 50 | 106 | 26′ |
| 1,248 | 40 | 124 | 28′ |
| 1,320 | 30 | 140 | 30′ |
| 1,392 | 20 | 154 | 32′ |
| 1,460 | 10 | 169 | 34′ |

Comparing Table III with Table I, it will be seen that substantially higher heat pumping rates (Q) can be obtained by increasing the current flow through the system when the pellet length per unit area is decreased.

Based upon the above analysis of our present understanding of the operation of thermopiles, reference is now made to FIGS. 4 to 10 which depict specific embodiments of "direct transfer" thermoelectric systems which utilize to advantage the above-described requirements for an efficient, high output thermopile.

Figure 4:
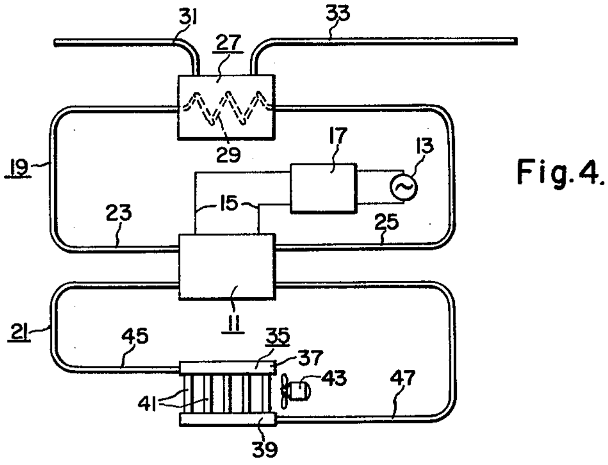
FIG. 4 is a schematic view of a thermoelectric system in which embodiments of the present invention may be utilized.

More specifically, in FIG. 4 there is illustrated in schematic form the operation of a thermopile wherein the cooled fluid is in liquid form and the cooling fluid is also in liquid form. A direct transfer thermopile is denoted generally by the reference character 11 and will be described in more detail as this specification proceeds. The thermopile 11 is provided with a pair of terminals which are formed to be energized by direct curent power passing from a power source 13 to the aforementioned terminals by conductors 15. In the event the power source 13 is of the alternating current type, as illustrated in FIG. 4, there is interposed between the power source 13 and the conductors 15 a rectifying means 17 which serves to convert the alternating potential to a direct current potential. In a liquid-to-liquid thermopile arrangement there is provided a flow circuit for the heated fluid, denoted generally by the reference character 19, and a flow circuit 21 for the cooled fluid. The heated fluid flow circuit 19 includes flow conduits 23 and 25 which are desirably connected to an internal flow circuit for heated fluid located within the thermopile 11. Flow circuit 19 also includes a heat exchange means, for example the heat exchanger 27 illustrated herein as a liquid-to-liquid type, and the conduits 23 and 25 are connected to a coiled heat exchange conduit 29, to form a recycling flow path. In the heat exchanger 27 the primary circuit is formed by the coiled tube 29, and a secondary circuit, formed by the outer casing of the heat exchanger 27 and includes an inlet conduit 31 and an outlet conduit 33 respectively communicating with the interior of the heat exchanger 27. As is apparent from FIG. 4, the primary circuit and secondary circuit of the heat exchanger 27 are disposed in heat exchange relationship. As heated fluid passes through the coil 29, such heated fluid is disposed in heat exchange relationship with secondary system fluid passing into the heat exchanger 27 through conduit 31 resulting in the heating of the secondary system fluid by the primary system fluid, and concurrently resulting in the cooling of the primary system fluid.

Similarly, the flow circuit 21 for the thermopile cooled fluid is provided with a heat exchanging means 35, illustrated in the example of FIG. 4 as a liquid-to-air heat exchanger. More specifically, the heat exchanger 35 is provided with a pair of spaced headers 37 and 39 the interiors of which are connected together by a plurality of heat exchange tubes 41. The tubes 41 desirably are spaced to permit the flow of air past the tubes 41 to cause cooling of the air. The flow of air past the tubes 41 is aided by suitable air circulating means such as a fan 43. The cooled fluid flow circuit 21 desirably is provided with a pair of conduits 45 and 47 and the conduits 45 and 47 are desirably connected to an internal cooled fluid flow circuit formed within the thermopile 11. The conduits 45 and 47 are also respectively connected to the headers 37 and 39 to form the closed recycling heat exchange loop 21.

From a thermodynamic standpoint, each of the recycling flow loops 19 and 21 is provided with a heat source and a heat sink. In the heated fluid flow circuit 19, the heat source comprises the thermopile 11 and the heat sink is formed by the heat exchanger 27. In the cooled fluid flow circuit 21, the heat sink is formed by the thermopile 11 and the heat source is formed by the heat exchanger 35. It will, therefore, be realized that the thermopile 11 forms both a heat source and a heat sink and, therefore, includes two independent flow circuits therein, one for the heated fluid and one for the cooled fluid.

Figures 5, 6:
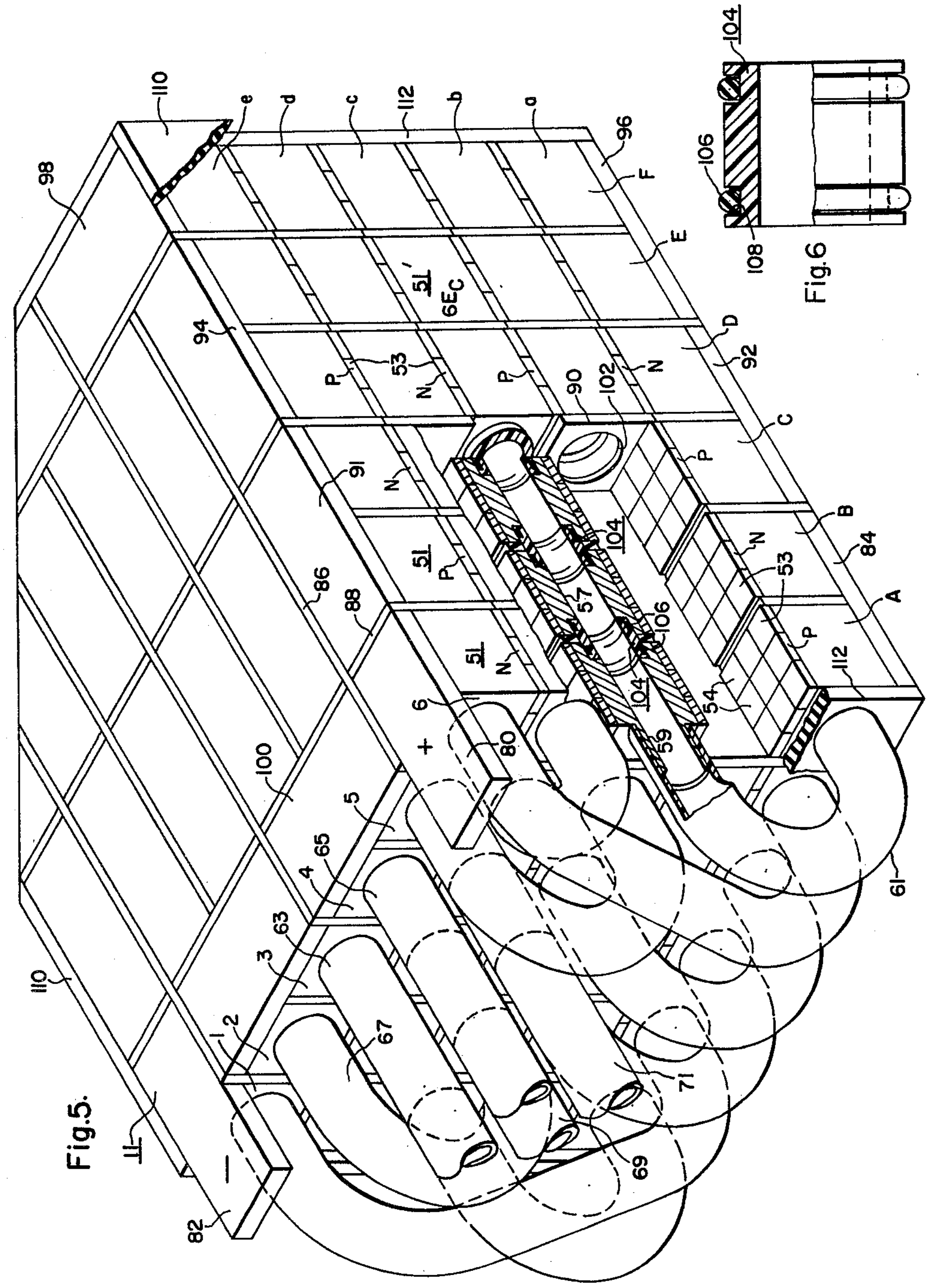
FIG. 5 is a composite view having portions thereof broken away and having portions in section illustrating a specific embodiment of this invention.
FIG. 6 is a side elevation view, partially in section, of a coupling element utilized in the arrangement illustrated in FIG. 5.

A specific example of a direct transfer thermopile 11 is illustrated in FIG. 5. The thermopile 11 of FIG. 5 is formed by a plurality of rows of electrically conductive and thermally conductive blocks 51, desirably formed from a material having very low resistance to the flow of current and having excellent heat transfer properties, for example, copper or aluminum.

For the purpose of referring to the rows of blocks 51 in FIG. 5, each of the front rows, of which six are illustrated, is denoted by the reference characters 1, 2, 3, 4, 5 and 6, respectively. Each of the side rows of blocks 51, going from front to the back of the thermopile 11 is denoted by the reference characters A, B, C, D, E and F, respectively, six of which are illustrated in FIG. 5. Similarly, each of blocks 51 forming a given row, moving from the bottom block in a thermopile row to the top block in a thermopile row is denoted by the reference characters A, B, C, D and E, respectively. Thus, to refer to any given block 51 in the thermopile 11, for example, the block denoted by the reference character 50′, such block may be identified by a combination of the aforementioned reference characters. Thus, the block 51′ can also be referred to as the block 6E*c*.

In accordance with the invention there is disposed intermediate each pair of vertically adjacent blocks 51, a quantity of thermoelectric material 53 of a suitable composition such as bismuth telluride. The thermoelectric material 53 is illustrated in this example as nine pellets 55 mounted on the confronting horizontal surfaces of the adjacent blocks 51. Each of the pellets 55 is formed to have a predetermined pellet length (the length of the material in the vertical direction the direction of current flow therethrough) for example 0.05 inch. Each of the pellets 55 may be fabricated by processes known in the art and each pellet 55 desirably is metallurgically bonded to the contiguous blocks 51 by suitable means, such as by soldering. The bonding procedure desirably provides a low resistance joint between the pellet 55 and the contiguous blocks 51. Each of the blocks 51 desirably includes a transverse opening or flow path 57 therethrough to permit the passage of a heat transfer fluid. Each of the flow openings 57 is formed integrally in the blocks 51 by suitable means, such as by a boring operation, and the opening 57 in each of the horizontally disposed rows of blocks extending from the front side of the thermopile to the back, is desirably disposed in alignment with one another to provide a continuous flow path therethrough. For example, the flow openings 57 in each of the blocks 6A*c*, 6B*c*, 6C*c*, 6D*c*, 6E*c* and 6F*c* form a continuous flow path through the device. Each of the end blocks 51 forming the front and rear surfaces of the thermopile 11, for example the blocks 51 and rows 1A, 2A, 3A, 4A, 5A and 6A and in 1F, 2F, 3F, 4F, 5F, 6F is provided with a tubular extension 59 (illustrated in FIG. 5 only in the front portion of the thermopile 10) which desirably is formed integrally of the blocks 51 and is disposed respectively in alignment with the adjacent flow paths 57. The extensions 59 are formed to receive tubular conduits 61 which interconnect predetermined flow paths 57 to form a pair of separate flow circuits through the thermopile, such that each block 51 comprises a segment of one of the flow paths. As will be described in FIGS. 8 and 9, the heated fluid (fluid to be warmed by the thermoelectric action), passes through one of the separate internal flow paths while the cooled fluid passes through the other internal flow path. Each set of blocks forming a given vertical level comprises a portion of the same flow path. For example, those blocks 51 in the upper horizontal row of blocks, at level *e*, form the flow path for heated fluid. The next lower level of blocks, or level *d*, form a portion of the flow path for cooled fluid. Similarly, the horizontal rows of blocks, at levels *a* and *c*, form a portion of the flow path for heated fluid, and the rows of blocks at level *b* complete the flow path for the cooled fluid.

Considering now the heated fluid flow path for the thermopile 11, it will be noted that an inlet conduit 63 is mounted on the tubulation 59 on the block 3A*e*. An exit conduit 65 for the heated fluid flow path is similarly secured to the tubulation 59 on the block 4A*e*.

Figure 8:
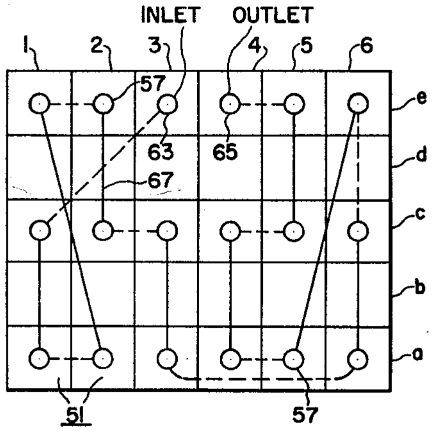
FIG. 8 is a schematic view of the thermopile of FIG. 5 illustrating the heated fluid flow circuit thereof.

The flow circuit for the heated fluid is illustrated schematically in FIG. 8. In referring to FIG. 8 solid lines connecting channels or flow paths 57 depict a tubular connection between the flow paths 57 disposed on the front surface of the thermopile 11, for example the tube 67. Connections between the flow paths 57 made at the rear of the thermopile are illustrated in FIG. 8 by dotted lines. The heated fluid flow circuit enters the thermopile 11 through the inlet 63 in horizontal row 3*e*. A rear connection of row 3*e* and row 1*c* is made so that fluid flows from row 3*e* to the blocks in the row 1*c*. The fluid then passes through row 1*a* by means of a connection made in the front of the thermopile 11. From row 1*a*, fluid passes to row 2*a* through a rear connection. The fluid then passes from row 2*a* to row 1*e* through a front connection and therefrom by a rear connection through row 2*e*. From row 2*e*, a front connection 67 is made to row 2*c* and fluid passes from row 2*c* to row 3*c* through a rear connection. A front connection is made between row 3*c* and row 3*a* and fluid passes from row 3*a* to row 6*a* through a rear connection. From row 6*a* the fluid passes through a front connection through row 6*c* and therefrom through a rear connection through row 6*e*. The flow path for heated fluid continues from row 6*e* through a front connection to row 5*a* and therefrom through a rear connection to row 4*a*. From row 4*a*, a front connection is made to row 4*c* and therefrom, by means of a rear connection, to row 5*c*. A front connection is formed between rows 5*c* and 5*e* to cause fluid to flow therethrough and fluid passes from row 5*e* to a rear connection through row 4*e*. The outlet conduit 65 is connected to the front tubulation of the block 4A*c*, so that fluid exits from the heated fluid flow circuit of the thermopile 11 from horizontal row 4*e*.

Figure 9:
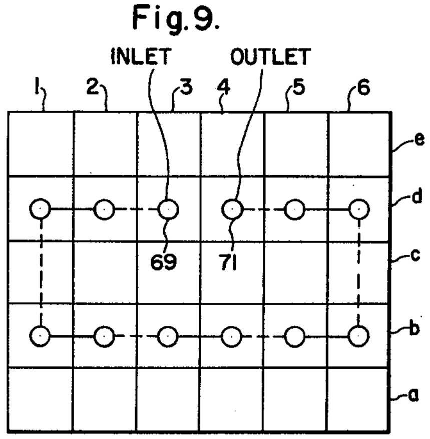
FIG. 9 is a view similar to FIG. 8 illustrating the cooled fluid flow circuit of the thermopile of FIG. 5.

Similarly, in FIG. 9, there is illustrated schematically the internal cooled fluid flow circuit. The cooled fluid flow circuit of the thermopile 10 includes an inlet conduit 69 connected to the tubulation 59 of the block 3A*d* and an outlet conduit 71 is connected to the tubulation 59 of the block 4A*d*. Fluid enters the cooled fluid flow circuit through the inlet conduit 69 and passes through the flow path 57 formed in horizontally extending row 3*d*. A rear connection is made between row 3*d* and row 2*d* to cause fluid to flow through the row 2*d*. From row 2*d*, fluid passes through the passageway 57 in row 1*a* by means of a front connection and from row 1*d* through row 1*b* by means of a rear connection between rows 1*d* and 1*b*. A front connection is made between rows 1*b* and 2*b* to cause fluid to flow through row 2*b* and therefrom to row 3*b* by means of a rear connection. From row 3*b* a front connection is made to row 4*b* and from the latter row to row 5*b* by means of a rear connection. Fluid then passes from row 5*b* to row 6*b* by means of a front connection and then through a rear connection made between rows 6*b* and 6*d* to cause fluid then to flow through row 6*d*. The cooled fluid flow path continues from row 6*d* to row 5*d* by means of a front connection and therefrom to row 4*d* by means of a rear connection. From row 4*d*, the fluid passes to the outlet conduit 71 which is connected to the front tubulation 59 of row 4*d*.

It is to be realized that in the discussion of the heated fluid flow circuit of FIG. 8 and the cooled fluid flow circuit of FIG. 9, each interconnection between horizontal rows of the thermopile 10 is formed by a conduit such as the conduit 67 illustrated in FIG. 5 with the conduit being secured in a leak-tight manner to the appropriate tubulations 59 along the front and rear surfaces respectively of the outward blocks 51.

In order to prevent short circuiting of the electrical flow path, presently to be described, of the thermopile 11, the flow conduits 67 desirably are formed from an insulating material such as a nylon tubing which may be suitably secured and/or clamped to the appropriate tubulations 59 to prevent leakage at the points of jointure. In addition, it is to be realized that the particular flow paths illustrated in FIGS. 8 and 9 are merely illustrative of flow paths which may be utilized with the thermopile 11 and that other flow paths may be substituted therefor. For example, the flow paths illustrated in FIGS. 8 and 9 are formed to pass through each of the rows of heated and cooled blocks respectively in a generally random manner, so that any other random manner of connections which accomplishes the same purpose can be substituted.

In order to obtain the respective thermoelectric heating and cooling of the fluids flowing through the two flow paths in the thermopile 11, an electrical current must be passed through the thermopile 11. In furtherance of this purpose, there are provided a pair of terminals 80 and 82 for the thermopile 11 with the positive terminal 80 being mounted on the upper surface of the block 6A*e* and secured thereto by suitable means to provide good electrical contact between the terminal 80 and the block 6A*e*. Similarly, a negative terminal 82 is mounted on the upper surface of the block 1A*e* to complete the electrical circuit of the thermopile 11. In this manner, direct current power is supplied between the terminals 80 and 82 and a current flow path, to be described, extends through each of the blocks 51 of the thermopile to form a complete electrical circuit. The thermopile electrical circuit is formed by a series connection of the terminals 80, blocks 51, thermoelectric material 53, conductor bridging straps, for example the strap 84 and the terminal 82. In order to provide the desired current flow path through the thermopile 11, insulating means are disposed in a predetermined manner between adjacent vertical rows of blocks 51 of the thermopile 11. In this manner the electrical flow path between adjacent rows of blocks is made continuous by means of the bridging conductor straps such as 84 without short circuiting the electrical path. The insulating means may be formed from a suitable sheet material such as the sheets 86 and 88 which are interleaved between adjacent vertical rows of blocks. If desired, the sheets 88 may be formed by a plurality of individual segments of insulating material such as the segment 90 illustrated in the broken away portion of FIG. 5. The insulating material 86 may be formed from any suitable sheet material, such as a thermoset resinous laminate, for example a silicone, phenolic, or melamine aldehyde resin applied to layers of glass cloth.

The conductor straps 84 are disposed at both the top and bottom surfaces of the thermopile 11 and are mounted to bridge alternating vertical rows of blocks 51 to form a generally sinusoidal current path which passes serially through each of the vertical rows of blocks. More specifically, the vertical rows 6A and 6B are electrically connected by a conducting strap 84 disposed on the bottom surface thereof and adjacent vertical rows 6B and 6C are connected electrically by a conducting strap 91 disposed on the top surface thereof. Similarly, the vertical rows 6C and 6D are joined by a conducting strap 92 disposed on the bottom surface of the thermopile 11 and rows 6D and 6E are joined by a conducting strap 94 disposed on the top surface of the thermopile 11. The rows 6E and 6F are electrically connected by a conductor strap 96 disposed on the bottom surface of the thermopile 11 and the row 6F, being disposed at the back of the thermopile 11 is then joined to the adjacent vertical row in the next series of rows of blocks 51. More specifically, the row 6F is joined to the row 5F by a bridging conductor strap 98 disposed on the upper surface of the thermopile 11. The series of rows of blocks 5A, 5B, 5C, 5D, 5E and 5F are similarly connected in series by appropriate bridging conductor straps and the latter series of rows are joined electrically to the series of rows 4A to 4F by a bridging conductor strap 100 similar in function to the strap 98. The aforementioned arrangement of joining electrically the adjacent rows of blocks to provide a continuous current flow path for the thermopile 11 is similarly provided for the remaining rows of the thermopile 11 until the current flow path reaches the terminal strap 82.

It will be noted that the insulating members 86 and 88 are interleaved between adjacent conductor straps such as 90, 94 and 98, to insulate electrically adjacently disposed conductor straps. In furtherance of this purpose the insulating means 86 and 88 extend between adjacent conductor straps to prevent a short circuiting of the current flow path which would eliminate the flow of current through a given row of blocks 51.

In constructing a thermopile, it is realized that the thermoelectric material 53 must be selectively disposed between adjacent blocks 51 to provide the same type of thermal action in each level of blocks 51, for example, the blocks 51 at level *e* are desirably formed so that the thermoelectric material generates heat at level *e*. Similarly, at level *d* the thermoelectric material 53 provides cooling in all of the blocks at level *d*. In each of the blocks 51 in levels *c* and *a*, the thermoelectric material is formed to provide heating while the blocks 51 at level *b*, should be subjected to a cooling action. In achieving the alternating heating action and cooling action at adjacent levels of blocks 51, it is to be remembered that as electrical current flows from n-type thermoelectric material to p-type thermoelectric material a cooling action is generated between the n-type material and the p-type material. Similarly, as electrical current passes from p-type material to n-type material a heating action is generated between the p- and n-type material. In considering electrical current in this manner, it is to be realized that we are considering direct current with the direction of current flow being the direction of conventional current flow rather than electron flow.

Thus, to provide respectively a heating action at level *e*, a cooling action at level *d*, a heating action at level *c*, a cooling action at level *b* and a heating action at level *a*, it will be realized that current flows from the terminal 80 to the block 6A*e* and then to the blocks 6A*d* and 6A*c*, respectively. Thermoelectric material 53 is disposed between the confronting surfaces of the blocks 6A*c* and 6A*d* as well as between blocks 6A*d* and 6A*c*. Thus, to achieve thermoelectric cooling in the block 6A*d*, it will be necessary for the thermoelectric material 53 between blocks 6A*c* and 6A*d* to be of the n-type polarity while the thermoelectric material disposed between blocks 6A*d* and 6A*c* is p-type material. In this manner thermoelectric heating will be generated in blocks 6A*e* and 6A*c* while thermoelectric cooling will be generated in blocks 6A*d*. Thermoelectric material of the alternate types are disposed alternately along the current flow path of the thermopile 11. Accordingly, in the event the thermoelectric material between blocks 6D*b* and 6D*c* is of the p-type, then the thermoelectric material between both blocks 6D*c* and 6D*d* and between blocks 6D*a* and 6D*b* will be n-type material. Similarly, alternate pellets of thermoelectric material 55 at the same level as the thermoelectric material between blocks 6D*d* and 6D*c* will also be n-type material. More specifically, the thermoelectric material between each of the following sets of blocks will be n-type material, between blocks 6E*c* and 6E*b*, blocks 5D*c* and 5D*b* and between blocks 6D*c* and 6C*d*. The aforementioned relative locations of thermoelectric materials of different polarities exists throughout the thermopile 11.

Referring now to the construction of the internal flow channels 57 of the thermopile 11, it will be noted that it is necessary to insulate completely, adjacent blocks 51 of adjacent rows in order to prevent a short circuiting of the current path through the thermopile 11. Inasmuch as each of the blocks 51 is formed from an electrically conductive material, it is necessary to maintain the blocks in adjacent rows in insulating relationship. As heretofore described, sheets of insulation 86 are interposed between longitudinal rows of blocks and insulating sheets 90 are interposed between laterally spaced rows of blocks. The sheets 90 desirably are segmented so that they may be interleaved between the sheets of insulation 86.

In order to provide continuity of flow through the flow passages 57, openings 102 are disposed in alignment with the flow passages 57. To prevent leakage between adjacent blocks 51 into the space wherein the discs 90 are disposed, suitable conduit means such as the tubular members 104 are interposed between laterally adjacent blocks 90. The tubular members 104 have the openings thereof disposed in alignment with the flow passages 57 and are closely received within enlarged offset portions 104 disposed in adjacent ends of adjacent blocks 51. One means of sealing the flow passages 51 is illustrated herein as a pair of O-rings 106, which are desirably fitted in recesses 108 formed in the tubular members 104. In order to maintain the insulated relationship between adjacent blocks 51 and laterally spaced rows, the tubular members 104 are formed from material having a high electrical resistance, for example, the insulating material forming the insulating members 86 and 88. The tubular members 104 are shown more particularly in FIG. 6. It will, therefore, be seen that the flow passages 57 continue along an entire longitudinal row of blocks 51 maintaining the proper insulation between adjacent laterally spaced blocks 51 and resulting in substantially no leakage at the joinders of the blocks 51. In order to prevent peripheral arcing along the exterior surfaces of the thermopile 11, for example on the side surfaces and the top and bottom surfaces, respectively, sheets of insulating material may be suitably disposed on the exterior surfaces of the thermopile 11. For example, insulating sheets 110 are desirably mounted on the opposed side surfaces of the thermopile 11 and insulating members 112 are desirably mounted on the front and rear surfaces respectively of the thermopile 11. The insulating sheets 112 desirably include a plurality of openings therein disposed to receive each of the tubulations 59 which extend outwardly from the front and rear surfaces respectively. In addition, similar sheets of insulating material may be mounted on the top and bottom surfaces of the thermopile 11.

Considering now the current flow path through the thermopile 11 it will be seen that the current passes directly from the electrically conductive block 51 through the thermoelectric pellets 55 to the next block 51 along the current flow path. Since the electrical resistance along the entire cross section of a given block 51 is substantially of the same magnitude, the current will be diffused substantially equally across the block 51, utilizing all of the thermoelectric material disposed adjacent the block.

It will be seen that cooling is generated by the thermoelectric material in one direction and heating is generated by the thermoelectric material in the opposite direction. Accordingly, the heat flow path for the generated heating and cooling passes directly from the thermoelectric material 53 to the adjacent flow conduits 57 disposed on opposite sides of the thermoelectric material 53. Since the blocks 51 are formed from a heat conductive material, it will be seen that the blocks 51 are respectively heated and cooled by the thermal changes caused by the thermoelectric material. The fluid flowing through the respective heated fluid and cooled fluid flow paths of the thermopile 11 passes in heat exchange relationship with the adjacent blocks 51 and is respectively heated or cooled by the blocks 51 in the flow path. It will be realized that there is provided no electrical insulation in the heat flow path from the thermoelectric material 53 to the flow channels 57. The heat flow path of the thermoelectric device is parallel to the electrical flow path of the device. As such, the removal of insulation from the heat flow path through the thermopile 11 constitutes a substantial increase in the efficiency of the thermopile 11 resulting in the use of a substantially small quantity of thermoelectric material 53 to obtain a predetermined amount of thermoelectric heating or cooling. Furthermore, the apparatus illustrated herein which achieves direct transfer thermoelectric heating and cooling is of a compact configuration requiring very little space so that the same is usable in applications wherein substantial space for cooling or heating equipment is not available.

It will be appreciated that for direct transfer thermoelectric apparatus, a power supply producing high currents at low voltages desirably is utilized. More specifically, the electrical resistance along the heat flow path is minimized so that a power supply which generates 9½ volts will produce 750 amperes of current through the thermopile 11.

Figure 7:
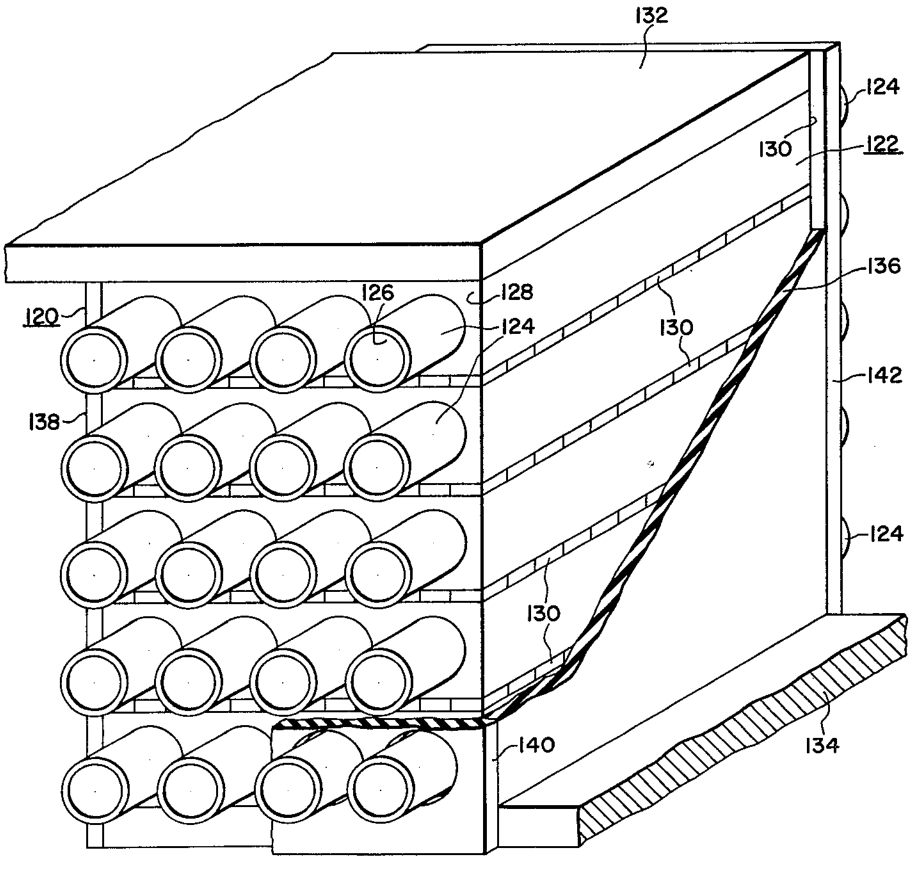
FIG. 7 is a perspective view of another embodiment of this invention.

In FIG. 7, a direct transfer thermoelectric apparatus 120 is illustrated and is suitable for use in applications wherein very large thermoelectric heating or cooling requirements exist. More specifically, instead of dividing the various levels of blocks 51 of FIG. 5 into a plurality of insulated groups, there is merely substituted a large block of a heat conductive material having flow conduits formed therein for each group of blocks 51 in FIG. 5 forming a given level. In accordance with FIG. 7, a plurality of blocks 122 are mounted in tandem to form the thermopile 120. Each of the blocks 122 desirably is formed from material having good heat transfer and electrical conductivity properties, such as copper or aluminum. Each block 122 is provided at its ends with a plurality of outwardly extending tubulations 124 and a plurality of flow passages 126 are formed in each block 122 intermediate juxtaposed tubulations 124, respectively. More specifically, each of the flow passages 126 passes from the tubulation 124 on the front surface 128 of the thermopile 120 through the block 122 and is connected to the tubulation 124 disposed at the rear surface 130 of the thermopile 120. The flow passages 126 correspond to the flow passages 56 of FIG. 5 with the exception that the flow passage is formed entirely in a single block 122. There is disposed between adjacent blocks 122 and the thermopile 120 a plurality of pellets of thermoelectric material 130. The pellets 130 desirably cover the entire juxtaposed surfaces between adjacent blocks 122. The layers of thermoelectric material 130 desirably alternate so that the upper layer comprises, for example, an n-type material, the adjacent layer a p-type material, the third layer an n-type material and the lowest layer a p-type material.

It will, therefore, be seen that the thermopile 120 of FIG. 7 comprises a thermopile of generally the same type as that illustrated in FIG. 5, but has a once-through electrical path. In this instance, however, the current merely passes directly through the entire surface of each of the blocks 122 rather than by means of the circuitous path of FIG. 5. In addition, it will be seen that a plurality of flow openings are formed in each of the blocks 122 rather than a single flow opening in the blocks 51 of FIG. 5. The thermoelectric function of the thermopile 120 is exactly the same as that of the thermopile 11 of FIG. 5 so that each of the blocks 122 comprises a portion of the heated fluid flow circuit or the cooled fluid flow circuit respectively. More particularly, the upper block 122 will be heated by the thermoelectric material and the successive blocks are alternately cooled and heated respectively, to provide layers which correspond thermodynamically to alternating heat source portions and heat sink portions. Each of the tubular passages 126 are connected in series in any suitable manner such as a connection similar to that illustrated in FIGS. 8 and 9 so that cooled fluid passes through each of the passages 126 in the cooled block 120 and heated fluid passes through each of the passages 126 in the heated blocks 122. In order to accomplish the once-through electrical flow path a pair of electrical terminals are respectively mounted on the upper and lower blocks 122 respectively. The upper or positive electrical terminal 132 is desirably formed to engage the entire upward surface of the upper block 122 and the lower or negative electrical terminal 134 is also formed to be disposed in intimate contact with the entire lower surface of the lowest block 122. In this manner, electrical current flowing from the upper terminal 132 to the lower terminal 134 is diffused and passes through the entire cross section of each of the blocks 122 and thermoelectric layers. In other words, the current density through the thermopile 122 is substantially equal per unit area. This equal current density is achieved by the fact that the resistance of the thermopile 120 is substantially equal per unit area.

In order to prevent arcing along the side walls of the thermopile 120, insulation means such as insulation sheets 136 and 138, formed from the same material as the insulation 110 of FIG. 5, are mounted on the two side walls of the thermopile 120, and similar insulation sheets 140 and 142 are mounted respectively on the front and rear side walls of the thermopile 120. The insulating sheets 140 and 142 desirably are provided with a plurality of openings therein to receive the tubulations 124 of the blocks 122 respectively.

Accordingly, in installations wherein substantial cooling tonnage is utilized, a unit of the type illustrated in FIG. 7 can be substituted for the thermopile arrangement illustrated in FIG. 5 so that insulating connectors such as the tubular members 104 need not be provided between adjacent blocks. The arrangement of FIG. 7, however, still results in a direct transfer thermopile arrangement wherein there is disposed no electrical insulation in the heat flow path of the thermopile 120. In other words, heating and cooling respectively pass from the thermoelectric pellet layers 130 to the appropriate blocks 122 and to the fluid passing through the flow passages 124 without encountering any electrical or heating insulation in the heat flow path.

This aspect of this invention permits the use of substantially smaller quantities of thermoelectric material having substantially smaller pellet lengths so that the heat pump approaches the quantities illustrated in FIG. 3, rather than the relatively smaller quantities illustrated in FIG. 1 for pellet length of increased dimensions.

Figure 10:
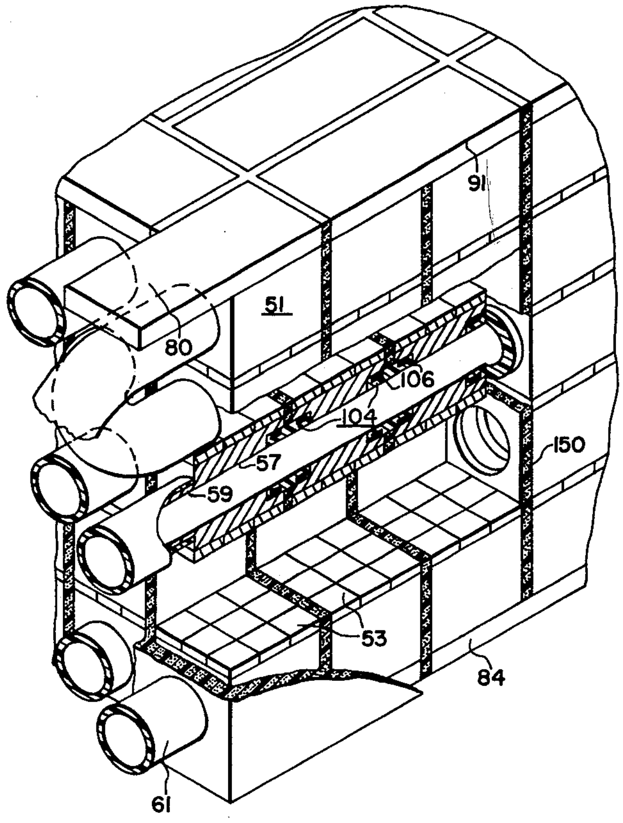
FIG. 10 is a fragmentary composite view of the apparatus of FIG. 5 and illustrating a modification.

With reference to the arrangement of FIG. 10, it will be appreciated that the FIG. 10 embodiment is similar to the apparatus of FIG. 5. Accordingly like parts will be designated by the same reference characters and will not be described again.

In FIG. 10, the sheet insulating materials 86, 90 and 112 of FIG. 5 has been removed and there has been substituted in their stead an insulating material 150 desirably formed from a moulded resinous powder. Several thermoset, moulded resinous materials, such as phenolic resins, urea resins, melamine resins and appropriate filter materials such as silica or asbestos, may be used for the insulating means 150. In accordance with this embodiment, the insulating means 150 is placed in all voids between modules 51, after the thermopile has been otherwise assembled. The insulation 150 initially is in a powder or powder-liquid suspension so that the same flows into all void spaces. The suspension is then thermally treated, with or without impressive forces exerted thereon, until the same solidifies to form an integral unitary mass. With this arrangement, the use of the several layers or sheets of insulating material 86 and 90 of FIG. 5 need not be individually positioned and assembled.

It is to be realized that it is only by virtue of the direct transfer aspects of the thermopile constructions of this invention that substantially higher heat pumping rates can be achieved for substantially smaller pellet lengths. As a result, decreased quantities of thermoelectric materials per ton of heating or cooling can be utilized. Referring more specifically to the family of curves illustrated in FIG. 2, the use of a direct transfer thermoelectric device permits the operating points for the thermopile to range in the family of curves 56, 58, 60, 62, 64 and 66, rather than the curves 50 and 52 of FIG. 2, wherein the heat pumping rates per pound of thermoelectric material is substantially smaller.

In accordance with the invention the thermopile illustrated herein can serve as an efficient electrical current producing device. In this regard, there is provided for the thermopile 11 of FIG. 1, a source of relatively high temperature fluid which flows through the thermopile 11 by the flow circuit formed by the conduits 63 and 65. The flow circuit formed by conduits 69 and 71 is connected to a source of relatively low temperature fluid, resulting in the creation of a temperature difference across each of the thermoelectric pellets 53. The thermoelectric pellets then act in reverse and produce an electrical potential in the thermopile 11, which potential is imposed across the terminals 80 and 82. The performance of the thermopile 11 as an electric generator provides the same advantages and efficiencies as those brought out herein in connection with the performance of the thermopile 11 as a temperature varying device.

It will be realized that when the thermopile 11 acts as an electric generator, the output voltage of the generator is dependent directly upon the temperature difference across the pellet ($\Delta t_p$). Accordingly the temperature difference across the pellet is desirably maintained as large as possible.

For an electrical generator, the equation governing the pellet temperature difference ($\Delta t_p$) is:

$$\Delta t_p = \Delta t - \Delta t_{rh} - \Delta t_{rc} \qquad (6)$$

where the quantities $\Delta t$, $\Delta t_{rh}$ and $\Delta t_{rc}$ are the same quantities described above in connection with Equation 4.

To provide a large value for $\Delta t_p$, it will be appreciated that the quantities $\Delta t_{rh}$ and $\Delta t_{rc}$ must be maintained as small as possible. In accordance with this invention, the quantities $\Delta t_{rh} + \Delta t_{rc}$ are very small in magnitude because there is provided no electrical insulation in the heat flow path. As a result, the use of good heat transfer material between the junctions of the thermoelectric pellets 53 and the adjacent heat sources and heat sinks formed by the adjacent flow passages 57 provides a construction wherein the condition described by Equation 5 is very nearly reached.

It will be appreciated that many modifications in the apparatus specifically shown and described herein may be made without departing from the broad spirit and scope of this invention. Accordingly, it is specifically intended that the thermopile arrangement shown and described herein be interpreted as illustrative of this invention rather than as limitative thereof.

We claim as our invention:

1. In a thermoelectric temperature varying device, a plurality of spaced layers of thermoelectric material, a plurality of electrically conducting members each having a straight through closed liquid pasageway formed therein, each of said members having generally opposed sides secured respectively to adjacent ones of said layers to bridge said adjacent ones of said layers, circuit means forming a series connected electrical current flow path through said members and said layers, terminal means coupled to the extremities of said current flow path, said straight through fluid passageways forming a pair of independent fluid passages each extending between said layers for fluids to be respectively heated and cooled therein, and adjacent ones of said passageways being disposed in insulated relationship to prevent the flow of current directly between said adjacent ones of said passageway means.

2. In a thermoelectric temperature varying device, a plurality of module stages, each of said stages comprising a block member formed of electrically conducting material with each block member having a pair of opposed surfaces, a layer of thermoelectric material mounted on each of said opposed surfaces, each of said block members having a straight through liquid passageway means extending therethrough between and generally parallel to said opposed surfaces thereof, conduit means connecting said liquid passageway means in series, and said conduit means being formed to resist the flow of electrical current therethrough.

3. In a thermoelectric temperature varying device, a plurality of module stages, each of said stages comprising a block member formed of electrically conducting material with each block member having a pair of opposed surfaces, a layer of thermoelectric material mounted on each of said opposed surfaces, each of said block members forming a straight through fluid passageway means therethrough extending between said surfaces, conduit means connecting each of said straight through fluid passageway means in series, and said conduit means being formed to resist the flow of electrical current therethrough, said passageway means comprising openings formed in said block members, said conduit means extending in part into said openings, and fluid sealing means interposed between juxtaposed portions of said openings and said conduit means.

4. In a thermoelectric temperature varying device, a plurality of module stages, each of said stages comprising a block member formed of electrically conducting material with each block member having a pair of opposed surfaces, a layer of thermoelectric material mounted on each of said opposed surfaces, each of said block members forming straight through fluid passageway means therethrough extending between said surfaces, conduit means connecting each of said fluid passageway means in series, and said conduit means being formed to resist the flow of electrical current therethrough, heat exchange means of electrically conducting material connected in bridging relationship across preselected adjacent stages, said heat exchange means being secured to one of said layers of one of said adjacent stages and to one of said layers of the other of said adjacent stages to form a series current flow path through said one stage and through said other stage.

5. In a thermoelectric temperature varying device, conduit means forming a fluid flow path, said conduit means including a plurality of spaced electrically conducting blocks having at least one straight through opening extending between opposed sides thereof and a plurality of straight through passageway means formed to resist the flow of electrical current therealong serially connecting the openings of adjacent ones of said blocks, each of said blocks having a pair of corresponding spaced surfaces thereon extending generally parallel to said opening, a layer of thermoelectric material mounted on each of said spaced surfaces, electrically conductive means mounted in bridging relationship from one of said thermoelectric layers of one of said blocks to the corresponding thermoelectric layer of another of said blocks, and said electrically conductive means having heat exchange means mounted thereon.

6. In a thermoelectric device, a module member of electrically conducting material having a pair of opposed surfaces, said module member having a layer of thermoelectric material mounted on each of said opposed surfaces, said module having a straight through conduit formed therein extending between said opposed surfaces generally parallel thereto for conducting a heat exchange fluid therethrough, and terminal means coupled to each of said layers of thermoelectric material forming an electrical current flow path which extends in series between said layers and said module member.

7. In a thermoelectric temperature varying device, the arrangement comprising a plurality of groups of at least three tandemly mounted heat exchange modules, whereby each of said groups includes a module located at a lower level, at an intermediate level and at an upper level; each of the corresponding ones of said modules in each of said groups located at said lower level having a straight through opening formed therein; electrically resistant passageway means connecting said last mentioned openings in series; each of said modules located at said intermediate level having straight through openings formed therein; electrically resistant conduit means connecting said last mentioned openings in series; each of said modules at said upper level having straight through openings formed therein; electrically resistant flow path means connecting said last mentioned openings in series, whereby said passageway means, said conduit means and said flow path means cooperate to form three separate flow circuits formed respectively at said lower, said intermediate and said upper levels; thermoelectric means disposed intermediate adjacent modules in each of said groups; conductor means disposed in bridging relationship across adjacent ones of said groups to connect each of said groups in electrical series; terminal means formed on predetermined ones of said modules for supplying electrical current through each of said modules in a series electrical flow path; said thermoelectric means being polarized to produce thermoelectric heating of the ones of said modules in said groups located at said intermediate level; said thermoelectric means also being polarized to produce thermoelectric cooling in the ones of said modules of each of said groups located at said lower and said upper levels; means supplying a heat exchange fluid to each of said flow circuits, whereby said heat exchange fluid flowing through the one of said flow circuits at the intermediate level is heated and the heat exchange fluids flowing through the ones of said flow circuits located at said upper and lower levels are cooled.

8. In a thermoelectric temperature varying device, the arrangement comprising a first group of tandemly mounted heat exchange modules, a layer of thermoelectric material disposed between and engaging adjacent opposed surfaces of adjacent ones of said modules with adjacent ones of said layers being thermoelectrically dissimilar, a second group of tandemly mounted heat exchange modules mounted coextensively with and adjacent said first module group, a layer of thermoelectric material disposed between and engaging adjacent surfaces of adjacent ones of said modules of said second group with adjacent ones of said layers being thermoelectrically dissimilar, the corresponding ones of said layers of said first and second groups being formed from thermoelectrically dissimilar material, a conductor electrically connecting the corresponding end modules of said first and second groups to form a series electrical flow path through said modules of said first and second groups, molded electrical insulating material disposed in substantially all voids between said first and second module groups, fluid flow path means formed directly in each of said modules and extending between said opposed surfaces thereof, and electrically insulated conduit means connecting said flow path means of the corresponding modules of said first and second groups respectively.

9. In a thermoelectric temperature varying device, a plurality of tandemly mounted electrically conducting heat exchange modules, a layer of thermoelectric material disposed between juxtaposed surfaces of adjacent ones of said modules, with adjacent ones of said layers being thermoelectrically dissimilar to respectively heat and cool alternating ones of said modules, each of said modules having a plurality of fluid flow openings formed therein extending between said surfaces thereof and substantially parallel to said layers, means for connecting said modules to a source of electrical power to cause current to flow through said modules and said layers.

10. In a thermoelectric temperature varying device, at least three tandemly mounted electrically conducting heat exchange modules, a layer of thermoelectric material disposed between juxtaposed surfaces of adjacent ones of said modules, with adjacent ones of said layers being thermoelectrically dissimilar to respectively heat and cool alternating ones of said modules, each of said modules having a plurality of fluid flow openings formed therein extending between said surfaces and substantially parallel to said layers, means for connecting said modules to a source of electrical power to cause current to flow through said modules and said layers, means for connecting each of said openings of said cooled modules in series to form a cooled fluid flow path, and means for connecting the remaining ones of said openings in series to form a heated fluid flow path.

References Cited by the Examiner

UNITED STATES PATENTS

| | | | |
|---|---|---|---|
| 2,729,949 | 1/56 | Lindenblad | 136—4.2 |
| 2,837,899 | 6/58 | Lindenblad | 62—3 |
| 2,870,610 | 1/59 | Lindenblad | 62—3 |
| 2,884,762 | 5/59 | Lindenblad | 62—3 |
| 2,937,218 | 5/60 | Sampietro | 62—3 |
| 3,006,979 | 10/61 | Rich | 62—3 |
| 3,054,840 | 9/62 | Alsing | 62—3 |
| 3,111,813 | 11/63 | Blumentritt | 62—3 |

ROBERT A. O'LEARY, *Primary Examiner.*

WILLIAM J. WYE, *Examiner.*